United States Patent [19]

Bauer

[11] 4,046,428
[45] Sept. 6, 1977

[54] TRACTION SHOE SEAL

[75] Inventor: John R. Bauer, North Canton, Ohio

[73] Assignee: The Goodyear Tire & Rubber Company, Akron, Ohio

[21] Appl. No.: 646,437

[22] Filed: Jan. 5, 1976

[51] Int. Cl.² .......................................... B62D 55/24
[52] U.S. Cl. ........................................ 305/11; 305/19
[58] Field of Search ............... 305/11, 19, 35 EB, 54; 152/175, 176, 187, 188, 193, 194, 198, 199; 277/207 R, 207 A, 207 B; 49/495, 489

[56] References Cited

U.S. PATENT DOCUMENTS

| 3,155,420 | 11/1964 | Belsky | 49/495 X |
| 3,799,501 | 3/1974 | Hartman | 49/489 X |
| 3,899,220 | 8/1975 | Grawey et al. | 305/54 X |
| 3,926,469 | 12/1975 | Ulics | 49/495 X |

Primary Examiner—Robert B. Reeves
Assistant Examiner—John P. Shannon
Attorney, Agent, or Firm—F. W. Brunner; R. P. Yaist; Frederick K. Lacher

[57] ABSTRACT

An elongated resilient sealing strip for sealing the space between a pair of adjacent articulated traction shoes of a removable track for tires having a flexible belt on which the shoes are mounted. The sealing strip has a base with edge portions located between the shoes and belt. In addition, a rib extends from the base into engagement with the surface of at least one of the shoes. The sealing strip may have an edge portion clamped between one of the shoes and the belt, or an edge portion may be adhered to a surface of one of the traction shoes. The rib may extend from the base at an angle to the belt-engaging surface and having a sealing edge engageable with the surface of one of the shoes.

8 Claims, 8 Drawing Figures

TRACTION SHOE SEAL

This invention relates generally, as indicated, to a removable track for an annular resilient tire. The track has a substantially inextensible annular belt for mounting on the outer circumferential surface of the tire and wear-resisting metal traction shoes clamped on the radially outer surface of the belt. The track-tire assembly is especially suited for off-the-road use over rock or other abrasive materials which have caused excessive tread wear of conventional off-the-road tires.

A tight seal is produced between the belt and the tire by inflation of the tire; however, wear of the belt under the shoes has been a problem because of dust, dirt and rock particles entering the space between the shoes and the belt.

Various devices have been proposed for sealing this space in the past including raised ribs on the belt surface extending between the traction shoes. With this device, the material of the ribs has been limited to the same material as the belt. Since the material of the belt must have a high tensile strength, adherence to the reinforcing cords and weather resistance as well as other belt properties to function, the sealing efficiency and capability of these ribs have been limited. This is because it has not been possible to provide the required belt properties as well as the optimum resilience and resistance to permanent compression set. Furthermore, in the manufacture of a track belt with raised ribs, it is difficult and costly to produce a molded body of reinforced rubber or other rubberlike material in which the ribs are accurately spaced for sealing engagement with the traction shoes. It can be appreciated that if the ribs are not in the correct locations on the belt, they may not be in sealing engagement with the traction shoes.

In other track designs, ribs have been provided in the belt-engaging surfaces of the shoes for engagement with the surface of the belt. Also, the leading and trailing edges of the shoes have been inclined to press against the belt surface. Here again, the seal is limited by the properties of the material of the belt which must be compounded and cured to provide minimum belt requirements and accordingly may not have the maximum sealing properties.

Another problem in sealing the space between the shoes and belt has been the difference in thickness of the belt which results from rubber shrinkage and other manufacturing variables. In addition, the clamping of the shoes to the belt by mounting bars extending through the belt and fastened to the shoes at the ends results in uneven compression forces across the belt making sealing difficult.

The shoes of the removable track are mounted for articulation with the flexing of the belt especially when the track engages the ground and several shoes provide the footprint in contact with the ground. Seals where the sealing material is fastened to both adjacent shoes have the disadvantage of being vulnerable to failure under the severe operating conditions of this track-tire assembly.

Fillers have been used on articulated conveyor belts to provide an uninterrupted surface. However, the links of these conveyor belts are not subject to the stresses and adverse operating condition under which the traction shoes of a track-tire assembly. It is also not desirable to fill the space between the traction shoes at the surface because this detracts from the cleaning of the treads and reduces the traction provided by the shoes.

With the foregoing in mind, it is the principal object of this invention to provide a sealing member between adjacent track members of a removable track with a belt-engaging base and a sealing rib in sealing engagement with at least one of the track members.

Another object is to provide for flexing of the sealing rib upon articulation of the track members to maintain the seal.

A further object is to provide for fastening the sealing member to one of the adjacent track members and for sealing engagement of the sealing member with the other of the track members.

A still further object is to provide for flexing of the edge of the sealing member base to maintain sealing engagement of the base edge during articulation of the track members.

Another object is to provide a sealing edge on a flexible sealing rib for engagement with the surface of one of the track members.

These and other objects of the present invention may be achieved by an elongated sealing strip having a belt-engaging base with edge portions located between the traction shoes and belt. The sealing strip has a flexible rib extending from the base into sealing engagement with the surface of at least one of the adjacent traction shoes.

To the accomplishment of the foregoing and related ends, the invention, then, comprises the features hereinafter fully described and particularly pointed out in the claims, the following description and the annexed drawings setting forth in detail a certain illustrative embodiment and a modification of the invention, these being indicative, however, of but two of the various ways in which the principles of the invention may be employed.

Figure 1:
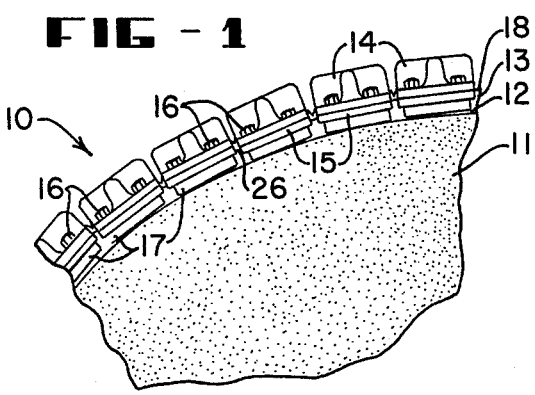
FIG. 1 is a fragmentary side elevation of a removable track-tire assembly mounted on a rim.

Referring to FIG. 1, a removable track 10 is shown mounted on an annular resilient tire 11 which may be mounted on a rim of a wheel (not shown). The track 10 may be of the type wherein the tire 11 is of resilient rubber or other rubberlike material reinforced by plies and having an outer circumferential surface 12 on which a cylindrical belt 13 of the track 10 is mounted. The belt 13 is an annular body of resilient rubber or other rubber-like material reinforced by circumferentially extending cords of steel or other substantially nonextensible material so that the belt is in the form of a flexible ring which may be placed over the outer circumferential surface 12 of the tire 11. In the preferred embodiment, the tire 11 is pneumatic and the belt 13 of the track 10 is held on the outer circumferential surface 12 of the tire by inflation of the tire providing torque-transmitting engagement between the tire and belt.

The belt 13 extends longitudinally along the circumference of the tire 11 and carries a plurality of track members such as the grousers or traction shoes 14 which may be of steel or other wear-resisting material for engagement with the ground. The traction shoes 14 are mounted at circumferentially spaced-apart positions along the belt 13 and are clamped to the belt by suitable means. In the present embodiment, mounting bars 15 are molded in the belt 13 at spaced-apart positions circumferentially of the belt. The ends of the mounting bars 15 extend from the edges of the belt 13 and have openings in alignment with openings in the traction shoes 14 through which fasteners such as bolts 16 extend. Retainer plates 17 are positioned under the ends of the mounting bars 15 and have threaded holes in alignment with the holes in the mounting bars and traction shoes 14 for threaded engagement with the bolts 16. Tightening of the bolts 16 clamps the traction shoes 14 to a radially outer surface 18 of the belt 13.

Figure 2:
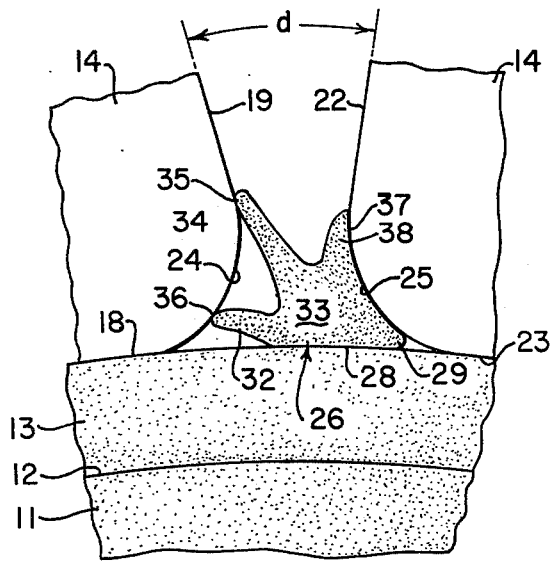
FIG. 2 is an enlarged fragmentary view like FIG. 1 showing the sealing strip in sealing engagement with two adjacent traction shoes in the same relative position as shown in FIG. 1.

As shown more clearly in FIG. 2, each of the traction shoes 14 has a leading edge surface 19 and a trailing edge surface 22. The leading edge surface 19 and trailing edge surface 22 are connected to a belt-engaging surface 23 of the traction shoes 14. The leading edge surface 19 and belt-engaging surface 23 are generally flat and connected by a curved surface 24. Likewise, the trailing edge surface 22 and belt-engaging surface 23 are generally flat and connected by a curved surface 25.

The space between the leading edge surface 19 and the trailing edge surface 22 is sealed to prevent the passage of dirt, dust and other abrasive material from entering the space between the belt-engaging surface 23 of the traction shoes 14 and the radially outer surface 18 of the belt 13 by a sealing member such as sealing strip 26 positioned between the adjacent traction shoes. The sealing strip 26 may be of a resilient plastic or rubber-like material and in the preferred embodiment, the sealing strip is an extruded elongated body of urethane having a tensile strength of approximately 5000 p.s.i., a Shore A hardness of 84 and a modulus of elongation of 600 percent. Other suitable materials including urethane may have a tensile strength of from 3000 to 7000 p.s.i., a hardness of from 60 Shore A to 50 Shore D and a modulus of elongation from 350 to 700 percent.

Figure 4:
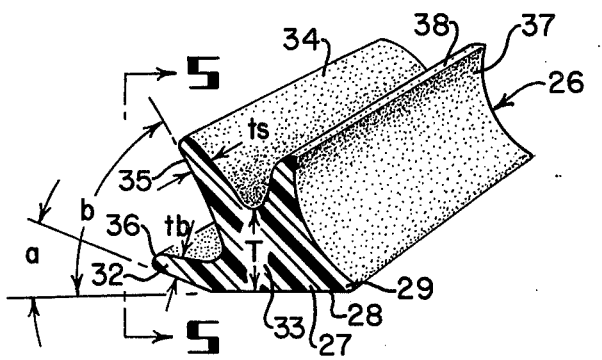
FIG. 4 is a view in perspective of one end of the sealing strip prior to mounting between the traction shoes with parts being broken away.
Figure 5:
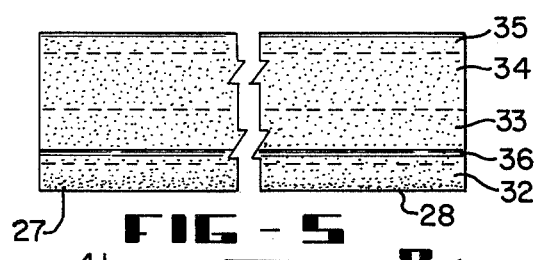
FIG. 5 is a side elevational view of the sealing strip taken along the plane of line 5—5 in FIG. 4.

As shown more clearly in FIGS. 4 and 5, the sealing strip 26 has a longitudinally extending base 27 with a belt-engaging surface 28. The base 27 has transversely extending edge portions of which one edge portion is a wedge-shaped projection 29 and the other edge portion is a base rib 32. The base rib 32 may extend away from the base 27 at an acute angle (a) relative to the belt-engaging surface 28 of between 10° and 30°. In the preferred embodiment shown in FIG. 4, the angle (a) of the base rib relative to the belt-engaging surface 28 is approximately 10°.

The sealing strip 26 has a longitudinal rib portion 33 extending upwardly from the base 27. A side rib 34 extends radially outward from the base 27 and at an acuate angle (b) relative to the belt-engaging surface 28 of from 45° to 75°. In the preferred embodiment, the side rib 34 is at an angle (b) of approximately 65°. The side rib 34 has a sealing edge 35 and the base rib 32 has a sealing edge 36 for engaging the leading edge surface 19 and curved surface 24 respectively. The thickness (tb) of the base rib 32 and the thickness (ts) of the side rib 34 is substantially less than the thickness T of the rib portion 33 so that the base rib and side rib will have flexibility relative to the rib portion.

The rib portion 33 also has a mounting surface 37 which is curved to conform to either the curved surface 24 of the leading edge or curved surface 25 of the trailing edge of the traction shoes 14. As shown in FIG. 2, the mounting surface 37 is adhered to the curved surface 25 of the trailing edge by a suitable adhesive with the belt-engaging surface 28 of the sealing strip 26 in engagement with the radially outer surface 18 of the belt 13. The distance between the adjacent traction shoes 14 is such that the sealing edge 35 of the side rib 34 is in sealing engagement with the leading edge surface 19 and the sealing edge 36 of the base rib 32 is in sealing engagement with the curved surface 24 of the leading edge. Both the base rib 32 and side rib 34 are spread apart a distance greater than the distance between the ribs in the molded or extruded condition, as shown in FIG. 4, so that the resiliency of the material of the sealing strip 26 will press the sealing edges 35 and 36 of the side rib and base rib against the leading edge surface 19 and curved surface 24. It will be seen that during operation the soil entering the space between the traction shoes 14 will further press the side rib 34 in a counterclockwise direction, as shown in FIG. 2, and increase the sealing pressure of the sealing edge 35 against the leading edge surface 19.

Figure 3:
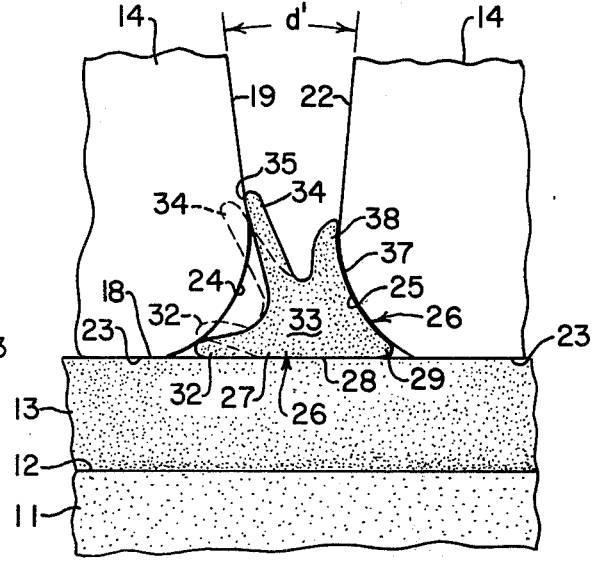
FIG. 3 is an enlarged fragmentary view like FIG. 2 showing the sealing strip in sealing engagement with the traction shoes of FIG. 2 which are deflected as in the footprint configuration when the shoes are in engagment with the ground.

As the tire 11 and the track 10 rotate, the traction shoes 14 will engage the ground and the tire and belt 13 will deflect into a position such as that shown in FIG. 3. The traction shoes 14 are mounted on the belt 13 so that they may be articulated to a position as shown in FIG. 3. As the traction shoes 14 move to the position shown in FIG. 3 from that shown in FIG. 2, the angle (d) between the leading edge surface 19 and trailing edge surface 22 decreases to an angle (d') and it is necessary that the sealing strip 26 maintain the seal during this articulation.

The sealing strip 26 adapts itself to this change in angle by movement of the base rib 32 and side rib 34 from the position shown in dotted lines to the position shown in solid lines in FIG. 3. Also the projection 29 is urged further under the curved surface 25 of the trailing edge and deflects the radially outer surface 18 of the belt 13. In this position, when the traction shoes 14 are engaging the ground and subject to the worst condition for abrasion-containing soil to enter the space between the belt-engaging surface 23 of the shoes and the radially outer surface 18 of the belt 13, the seal between the sealing strip 26 and the traction shoes is more soil resistant due to the forces of the soil on the side rib 34 urging the sealing edge 35 against the leading edge surface 19. These forces also press a rib portion extension 38 supporting the mounting surface 37 into engagement with the curved surface 25 of the trailing edge to increase the adherence of the sealing strip 26 to that curved surface.

As the track 10 and tire 11 rotate, the traction shoes 14 are also articulated from the position shown in FIG. 3 to the position shown in FIG. 2 upon leaving the ground-engaging zone and the angle between the leading edge surface 19 and trailing edge surface 22 increases from the angle (d') to the angle (d). As this occurs, the resiliency of the base rib 32 and side rib 34 will urge the ribs from the position shown in solid lines in FIG. 3 to the position shown in dotted lines which corresponds with the position shown in FIG. 2 and the seal between these sealing edges 35 and 36 and the leading edge surface 19 and curved surface 24 will be maintained. This flexing of the side rib 34 also will contribute to the removal of soil from the space between the traction shoes 14 and thereby help clean the track 10.

Figure 7:
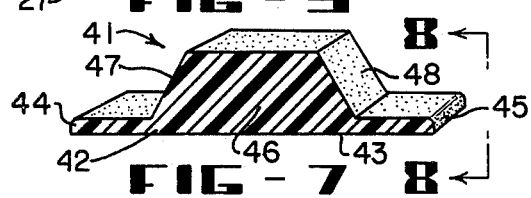
FIG. 7 is a view in perspective of one end of the sealing strip shown in FIG. 6 in the condition prior to mounting between the traction shoes with parts being broken away.
Figure 8:
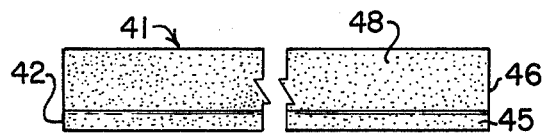
FIG. 8 is a side elevational view of the modified sealing strip taken along the plane of line 8—8 in FIG. 7.
Figure 6:
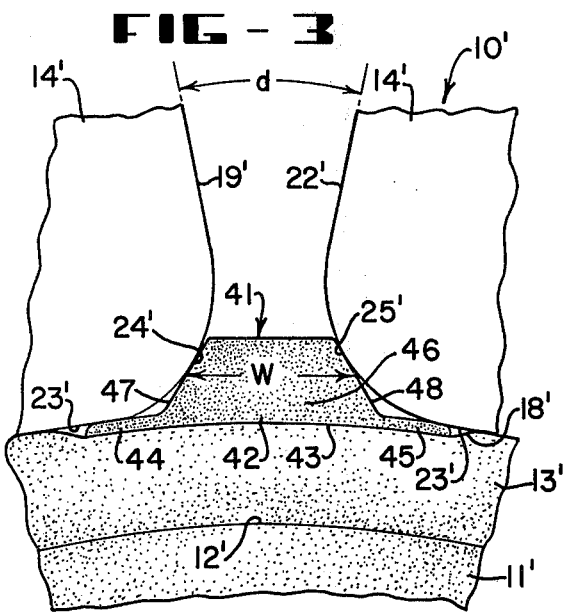
FIG. 6 is an enlarged fragmentary view like FIG. 2 of a modification showing the sealing strip mounted between and in sealing engagement with two traction shoes in the position shown in FIG. 1.

Referring to FIGS. 6, 7 and 8, a modification is shown in which a longitudinally extending elongated body of resilient plastic or rubberlike material or sealing strip 41 is positioned between traction shoes 14' of a removable track 10' mounted on a tire 11'. The traction shoes 14' are clamped on a cylindrical belt 13' which is mounted on the outer circumferential surface 12' of the tire 11'. The sealing strip 41 is of a resilient material such as urethane and has a base 42 with a belt-engaging surface 43. Transversely extending edge portions 44 and 45 extend longitudinally of the sealing strip 41 at each side. A rib portion 46 extends upwardly from the base 42 and has a first sealing surface 47 on one side and a second sealing surface 48 on the other side. The sealing surfaces 47 and 48 may be inclined to provide the rib portion 46 with a wedge shape. As shown in FIG. 6, the sealing strip 41 may be mounted on a radially outer surface 18' of the belt 13' with the edge portions 44 and 45 under the belt-engaging surfaces 23' of the traction shoes 14'. As the traction shoes 14' are clamped against the belt 13', the edge portions 44 and 45 will be pressed against the surface 18' of the belt which will be deflected, as shown in FIG. 6, providing a secure mounting of the sealing strip 41 between the traction shoes.

The first sealing surface 47 and second sealing surface 48 of the rib portion 46 are spaced at an average distance W as shown in FIG. 6 so that a curved surface 24' at the leading edge and a curved surface 25' at the trailing edge will compress the rib portion 46 and provide the desired seal. During operation, when the traction shoes 14' are moved into a position where the angle (d) between a leading edge surface 19' and a trailing edge surface 22' is reduced, the rib portion 46 will be further compressed and the seal maintained. Then as the traction shoes 14' are moved back to the position shown in FIG. 6, the seal will be maintained through the resiliency of the sealing strip 41 whereby the first sealing surface 47 and second sealing surface 48 of the sealing strip are maintained in sealing engagement with the curved surfaces 24' and 25' of the traction shoes. Here again, the pressure of soil between the leading edge surface 19' and the trailing edge surface 22' pressing against the rib portion 46 of the sealing strip 41 will tend to spread the sealing surfaces 47 and 48 and thereby increase the sealing capability of the sealing strip.

While certain representative embodiments and details have been shown for the purpose of illustrating the invention, it will be apparent to those skilled in the art that various changes and other modifications may be made therein without departing from the invention.

What is claimed is:

1. A removable track for an annular resilient tire comprising an annular belt having a radially outer surface, a plurality of track members mounted on said radially outer surface at circumferentially spaced-apart positions, sealing members disposed between said track members, each of said sealing members including an elongated body of resilient material having a longitudinal base with a belt-engaging surface engageable with said radially outer surface of said belt, said base having transversely extending edge portions, said edge portions being disposed between said track members and said outer surface of said belt, and a longitudinally extending rib portion of said sealing member extending radially outward from said base for engagement with the surface of at least one of said track members.

2. A removable track in accordance with claim 1 wherein said rib portion has a first surface on one side for engagement with the surface of a first one of said track members.

3. A removable track in accordance with claim 2 wherein said rib portion of each of said sealing members has a second surface on the opposite side of said rib portion for engagement with the surface of a second one of said track members.

4. A removable track in accordance with claim 1 wherein one of said transversely extending edge portions includes a longitudinally extending base rib disposed at an acute angle to said belt-engaging surface of said base, said base rib having a thickness less than the thickness of said base for flexing upon articulation of said track members to maintain a sealing relationship between said track members.

5. A removable track in accordance with claim 4 wherein said angle between said base rib and said belt-engaging surface is from 10° to 30°.

6. A removable track in accordance with claim 2 wherein said body includes a flexible, longitudinal side rib for engagement with a surface of said second one of said track members, said side rib extending from said rib portion in a direction away from said belt-engaging surface of said base and said side rib having a sealing edge for engagement with said surface of said second one of said track members.

7. A removable track in accordance with claim 6 wherein said side rib extends away from said rib portion at an angle of between 45° to 75° relative to said belt-engaging surface for engagement with said surface of said second one of said track members.

8. A removable track in accordance with claim 2 wherein said first surface of said rib portion is adhered to said surface of said first one of said track members by an adhesive.

* * * * *